United States Patent
Sato et al.

(10) Patent No.: US 9,103,444 B2
(45) Date of Patent: Aug. 11, 2015

(54) ACRYLIC RUBBER COMPOSITION

(75) Inventors: Takeshi Sato, Fujisawa (JP); Ayako Niikura, Fujisawa (JP)

(73) Assignee: NOK Corporation, Tokyo (JP)

( * ) Notice: Subject to any disclaimer, the term of this patent is extended or adjusted under 35 U.S.C. 154(b) by 346 days.

(21) Appl. No.: 13/337,449

(22) Filed: Dec. 27, 2011

(65) Prior Publication Data

US 2012/0091624 A1    Apr. 19, 2012

Related U.S. Application Data

(63) Continuation of application No. 12/997,669, filed as application No. PCT/JP2009/062100 on Jul. 2, 2009, now abandoned.

(30) Foreign Application Priority Data

Jul. 2, 2008 (JP) .................................. 2008-173988

(51) Int. Cl.
| | |
|---|---|
| *F16J 15/10* | (2006.01) |
| *C08L 33/08* | (2006.01) |
| *C08K 3/04* | (2006.01) |
| *C08K 5/00* | (2006.01) |
| *C08K 5/01* | (2006.01) |
| *C08K 7/00* | (2006.01) |
| *C08L 91/00* | (2006.01) |

(52) U.S. Cl.
CPC ............... *F16J 15/102* (2013.01); *C08L 33/08* (2013.01); *C08K 3/04* (2013.01); *C08K 5/0025* (2013.01); *C08K 5/01* (2013.01); *C08K 7/00* (2013.01); *C08L 91/00* (2013.01)

(58) Field of Classification Search
CPC ........ C08L 33/08; C08L 91/00; F16J 15/102; C08K 3/04
USPC .......................................... 524/495; 264/236
See application file for complete search history.

(56) References Cited

U.S. PATENT DOCUMENTS

| | | | |
|---|---|---|---|
| 6,406,030 B1 * | 6/2002 | Fang et al. ..................... | 277/407 |
| 6,407,179 B1 * | 6/2002 | Hagiwara et al. .......... | 525/330.3 |
| 2002/0037970 A1 * | 3/2002 | Moriyama et al. ......... | 525/330.3 |

FOREIGN PATENT DOCUMENTS

| | | |
|---|---|---|
| JP | 08-3410 | 1/1996 |
| WO | WO2007145337 A1 | 12/2007 |
| WO | WO2007145338 A1 | 12/2007 |

* cited by examiner

*Primary Examiner* — Ling Choi
*Assistant Examiner* — Wenwen Cai
(74) *Attorney, Agent, or Firm* — K. David Crockett, Esq.; Niky Economy Syrengelas, Esq.; Crockett & Crockett, PC

(57) ABSTRACT

An acrylic rubber composition comprising 100 parts by weight of an ACM polymer, which contains monomers each having a carboxyl group(s) as crosslinking-site monomers, respectively, and 5 to 30 parts by weight of vein graphite or flake graphite. An acrylic rubber composition having 100 parts by weight of an ACM polymer, which contains monomers each having a carboxyl group(s) as crosslinking-site monomers, respectively, 5 to 30 parts by weight of vein graphite or flake graphite, and 0.5 to 1.5 parts by weight of a liquid paraffin.

2 Claims, No Drawings

ACRYLIC RUBBER COMPOSITION

This application is a continuation of U.S. application Ser. No. 12/997,669, filed Dec. 13, 2010, which is the National Stage of International Application No. PCT/JP2009/062100, filed Jul. 2, 2009, which claims the benefit of JP 2008-173988, filed Jul. 2, 2008.

TECHNICAL FIELD

The present invention relates to an acrylic rubber composition to be molded and used for a sealing part such as an O-ring, gasket, and packing, and particularly to an acrylic rubber composition, which is substantially free of deterioration of physical properties and which is excellent in processability.

BACKGROUND ART

Products prepared from acrylic rubber compositions possess heat resistance comparable to silicone rubbers and fluororubbers, and oil resistance comparable to fluororubbers, nitrile rubbers, and hydrin rubbers, and are superior to nitrile rubbers, hydrin rubbers, and the like, in oil resistance at high temperatures. Since the products are excellent in heat resistance and oil resistance and are relatively inexpensive, they are used as sealing parts such as O-rings, gaskets, or packings.

Those cross-linked types of acrylic rubber compositions described in Patent Documents 1 and 2, which contain monomers each having a carboxyl group(s) as crosslinking-site monomers, are materials superb in heat resistance and compression set property. However, these compositions are defective in processing characteristics, particularly in roll tackiness upon kneading and tackiness of unvulcanized (uncrosslinked), dough-like material (green stock), and are thus still deficient in processability. Processing steps therefore tend to become complicated, thereby possibly bringing about a factor of increased cost.

Disclosed in Patent Document 3 is an acrylic elastomer composition, which is obtained by combining carbon black, a silica filler, and the like into an acrylic elastomer, and which is used for production of an O-ring, a gasket material, and the like.

However, when reinforcing materials such as carbon black and silica are simply blended, the resulting composition is still considerably high in roll tackiness upon kneading process, and in tacking among unvulcanized (uncrosslinked), dough-like materials in a vulcanizing (crosslinking) step, thereby problematically resulting in a material exhibiting an insufficient processability.
Patent Document 1: WO2007/145337
Patent Document 2: WO2007/145338
Patent Document 3: JP08-3410A

DISCLOSURE OF INVENTION

Problem to be Solved by the Invention

It is therefore an object of the present invention to provide an acrylic rubber composition, which is improved in roll tackiness upon processing and in dough-like-material tackiness between dough-like materials themselves, and which is remarkably improved in processing characteristic, without deteriorating resultant normal physical properties.

It is another object of the present invention to provide an acrylic rubber composition usable for production of a sealing part such as an O-ring, gasket, and packing.

The other objects of the present invention will become apparent from the following description.

Means for Solving Problem

The above objects are carried out by the following inventions.

The invention resides in an acrylic rubber composition comprising:
100 parts by weight of an ACM polymer, which contains monomers each having a carboxyl group(s) as crosslinking-site monomers, respectively; and
5 to 30 parts by weight of vein graphite or flake graphite.

The invention also resides in an acrylic rubber composition comprising:
100 parts by weight of an ACM polymer, which contains monomers each having a carboxyl group(s) as crosslinking-site monomers, respectively;
5 to 30 parts by weight of vein graphite or flake graphite; and
0.5 to 1.5 parts by weight of a liquid paraffin.

The invention also resides in the acrylic rubber composition, wherein the acrylic rubber composition is used for production of a sealing part selected from a group consisting of an O-ring, gasket, and packing.

Effect of the Invention

According to the present invention, it becomes possible to provide an acrylic rubber composition usable for production of a sealing part such as an O-ring, gasket, and packing, which composition is improved in roll tackiness upon processing and in dough-like-material tackiness between dough-like materials themselves, and which composition is remarkably improved in processing characteristics, without degrading normal physical properties of the composition.

BEST MODE(S) FOR CARRYING OUT THE INVENTION

Embodiments of the present invention will be described herein.
<ACM Polymer>

Used in the acrylic rubber composition of the present invention is an ACM polymer (acrylic rubber polymer) which contains monomers each having a carboxyl group(s) as crosslinking-site monomers, respectively.

Examples of a crosslinking-site monomer having a carboxyl group(s) include acrylic acid, methacrylic acid, crotonic acid, 2-pentenoic acid, maleic acid, fumaric acid, itaconic acid, maleic acid monoalkyl ester, fumaric acid monoalkyl ester, itaconic acid monoalkyl ester, and the like.

The ACM polymer to be used in the present invention is to preferably include therein crosslinking-site monomer units at a molar content ratio within a range of 0.5 to 2.

The ACM polymer to be used in the present invention is obtainable by copolymerizing those components, which contain main-component monomers (including crosslinking-site monomers) and other copolymerizable monomers, by a known method such as emulsion polymerization, suspension polymerization, solution polymerization, bulk polymerization, or the like.

Examples of a monomer component, which constitutes the ACM polymer cooperatively with the monomers each having a carboxyl group(s) as crosslinking-site monomers, respectively, include alkoxyalkyl acrylate, and butyl acrylate.

Examples of alkoxyalkyl acrylate include methoxyethyl acrylate (MEA), methoxybutyl acrylate, ethoxybutyl acrylate, and the like.

The acrylic rubber used in the present invention is available as a commercial product, and preferably usable examples of the commercial product include "AR14" and "AR12" produced by JSR corporation.

<Blending Component>

The present invention is characterized in that vein graphite or flake graphite is blended into the ACM polymer.

Generally, graphite is classified into (1) vein graphite (Vein Gr.), (2) flake graphite (Flake Gr.), and (3) amorphous graphite (Amorphous Gr.), according to a classification as an international commodity. Examples of the vein graphite (1) include: lumps in massive shapes of 2 to 3 cm in average size; chips like wood chips; and dusts in a powdery state; depending on sizes, purities, and the like. Unlike the vein graphite, the flake graphite (2) is not massive and comprises leaflet-like crystals in external appearance. The amorphous graphite (3) is derived from a coal seam in a sedimentary rock or the like, having been graphitized by thermal metamorphism, and is soil-like or soil lump-like in external appearance. Other examples of graphite include: artificial graphite (obtained by molding and firing a petroleum coke or the like as a starting material, followed by graphitization at a high temperature of 2,500° or higher); an expandable graphite (produced by chemically treating a natural flake graphite); and an expanded graphite (obtained by heating the expandable graphite at a high temperature to thereby expand it into a caterpillar shape (up to 100 to 300 times in size).

Among them, the present invention is configured to use the vein graphite, or the flake graphite having leaflet-like crystals. Particularly, the flake graphite is preferable in desirably exhibiting the effect of the present invention. It is noted that the effect of the present invention cannot be exhibited, in case of adopting a different type of graphite such as amorphous graphite, artificial graphite, or the like.

The flake graphite has an average particle diameter preferably within a range of 5 to 30 µm, and more preferably within a range of 8 to 20 µm.

The blending amount of the flake graphite is within a range of 5 to 30 parts by weight, and preferably within a range of 5 to 20 parts by weight, relative to 100 parts by weight of the ACM polymer. Blending amounts of the flake graphite exceeding 30 parts by weight undesirably and considerably deteriorate a tensile strength TB, an ultimate elongation EB, and the like of a resultant rubber. In turn, blending amounts less than 5 parts by weight are unable to improve the roll tackiness.

The flake graphite to be used in the present invention is available as a commercial product, and examples of the commercial product include "C-1" produced by Nichiden Carbon Co., Ltd.

Further, it is a preferable configuration in the present invention to blend a liquid paraffin into the ACM polymer, together with the vein graphite or flake graphite.

The liquid paraffin is to be blended as a processing aid, and the liquid paraffin to be used in the present invention has a viscosity preferably within a range of 10 to 20 (CSt40° C.), and more preferably within a range of 10 to 15 (CSt40° C.).

The blending amount of the liquid paraffin is within a range of 0.5 to 1.5 parts by weight, and preferably within a range of 1.0 to 1.5 parts by weight, relative to 100 parts by weight of the ACM polymer.

Blending amounts of the liquid paraffin exceeding 1.5 parts by weight undesirably deteriorate the compression set (CS).

The liquid paraffin of the present invention is available as a commercial product, and examples of the commercial product include "70-S" (viscosity: 12.7 CSt (40° C.)) produced by Sanko Chemical Co., Ltd.

In the present invention, the flake graphite is blended in an amount within a range of 5 to 30 parts by weight relative to 100 parts by weight of the ACM polymer, thereby providing an acrylic rubber composition, which is improved in roll tackiness upon processing and in dough-like-material tackiness between dough-like materials themselves, and which is remarkably improved in processing characteristic, without bringing about deterioration of resultant normal physical properties such as rubber hardness Hs, tensile strength TB, and ultimate elongation EB.

Further, in the present invention, the flake graphite and the liquid paraffin are blended in amounts within a range of 5 to 30 parts by weight and within a range of 0.5 to 1.5 parts by weight, respectively, relative to 100 parts by weight of the ACM polymer, thereby providing an acrylic rubber composition, which is improved in roll tackiness upon processing and in dough-like-material tackiness between dough-like materials themselves, and which is remarkably improved in processing characteristic, without bringing about deterioration of resultant normal physical properties such as rubber hardness Hs, tensile strength TB, and ultimate elongation EB.

Namely, as will be noted in Examples to be described later, when only a liquid paraffin (in an amount of 2 parts by weight, for example) is blended relative to 100 parts by weight of the ACM polymer, the resultant compression set (CS) is deteriorated, thereby failing to keep a balance between the compression set (CS) and the processability. However, when the liquid paraffin and the flake graphite are combined at a blending formulation of the flake graphite within a range of 5 to 30 parts by weight and the liquid paraffin within a range of 0.5 to 1.5 parts by weight, the compression set (CS) can be preferably balanced with the processability, and other physical properties can also be more improved as compared to the blending of the flake graphite only.

<Vulcanizing Agent (Crosslinking Agent)>

Desirable as a vulcanizing agent (crosslinking agent) to be used in the present invention, is an amine compound, which is capable of relatively readily forming a cross-linked structure together with the carboxyl group(s) in the ACM polymer.

Preferable examples of such an amine compound include an aliphatic multivalent amine crosslinking agent, and an aromatic multivalent amine crosslinking agent.

Examples of the aliphatic multivalent amine crosslinking agent include hexamethylenediamine, hexamethylenediamine carbamate, tetramethylenepentamine, N,N'-dicinnamylidene-1,6-hexanediamine, and 4,4'-methylenebis(cyclohexylamine) carbamate.

Examples of the aromatic multivalent amine crosslinking agent include 4,4'-methylenedianiline, 4,4'-oxyphenyldiphenylamine, m-phenylenediamine, p-phenylenediamine, 4,4'-methylenebis(o-chloroaniline), 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylene diamine, p-xylylene diamine, 1,3,5-benzenetriamine, 1,3,5-benzenetriaminomethyl, hexamethylenediamine-cinnamaldehyde adduct, and a hexamethylenediamine-dibenzoate salt.

Although it is possible in the present invention to directly adopt hexamethylenediamine carbamate (commercially available Diak No. 1), N,N'-dicinnamylidene-1,6-hexanediamine (commercially available Diak No. 3), 4,4'-methylenebis(cyclohexylamine)carbamate (commercially available Diak No. 4) and the like, it is preferable to adopt N,N'-dicinnamylidene-1,6-hexanediamine (commercially available Diak No. 3) from a standpoint of a scorching property and a vulcanizing (crosslinking) rate.

In the acrylic rubber composition of the present invention, it is possible to blend a cross-linking promoter thereinto, combinedly with the crosslinking agent. Examples of the cross-linking promoter usable combinedly with the crosslinking agent, include a guanidine compound, an imidazole compound, a quaternary onium salt, a tertiary phosphine compound, an alkali metal salt of weak acid, and the like.

Examples of the guanidine compound include 1,3-diphenylguanidine, 1,3-diorthotolylguanidine, tetramethylguanidine, dibutylguanidine, and the like.

Examples of the imidazole compound include 2-methylimidazole, 2-phenylimidazole, and the like.

Examples of the quaternary onium salt include tetra-n-butyl ammonium bromide, octadecyl-tri-n-butyl ammonium bromide, and the like.

Examples of the multivalent tertiary amine compound include triethylenediamine, 1,8-diaza-bicyclo[5.4.0]undecene-7, and the like.

Examples of the tertiary phosphine compound include triphenylphosphine, tri-p-tolylphosphine, and the like.

Examples of the alkali metal salt of weak acid include: a salt of inorganic weak acid such as a phosphate, carbonate, or the like of sodium or potassium; and a salt of organic weak acid such as a stearate, laurylate, or the like of sodium or potassium.

It is preferable in the present invention to adopt a diamine compound as the vulcanizing agent (crosslinking agent), and the guanidine compound as the vulcanization accelerator (crosslink accelerator). In that case, it is preferable to blend the diamine compound in an amount of 0.2 to 2.0 parts by weight and the guanidine compound in an amount of 0.5 to 4.0 parts by weight, relative to 100 parts by weight of the acrylic rubber polymer.

<Other Blending Component>

In addition to the above, it is preferable to blend carbon black into the acrylic rubber composition of the present invention. In the present invention, the blending amount of carbon black is preferably within a range of 40 to 100 parts by weight, more preferably within a range of 60 to 90 parts by weight, relative to 100 parts by weight of the polymer.

The carbon black to be used in the present invention is to preferably have a primary particle diameter within a range of 40 to 100 nm. Here, the primary particle diameter means an average diameter calculated by measuring small spherical components (which have contours based on microcrystals, and are not separable) constituting a carbon black agglomerate, by means of electron photomicrograph; and this primary particle diameter is the same as what is described as a definition of a particle diameter in "Carbon Black Yearbook 1998", No. 48 issued by Carbon Black Association. Further, an arithmetic average is adopted in calculating the primary particle diameter in the present invention. Examples of carbon black preferably usable in the present invention include "FEF carbon/SEAST G-SO" (primary particle diameter: 40 to 48 nm) produced by Tokai Carbon Co., Ltd.

In addition to the above components, those blending components typically used in a rubber industry are appropriately added and used, as required, as rubber blending components such as: a processing aid such as stearic acid, and palmitic acid; an acid acceptor such as zinc oxide, and magnesium oxide; an antioxidant; a plasticizer; and the like.

<Preparation, Cross-Linking, and Molding of Rubber Composition>

In preparation of the rubber composition of the present invention, it is possible to adopt an appropriate mixing method such as kneading by using: a kneader such as an intermix, kneader, Banbury mixer, or the like; an open roll mill; or the like.

Upon cross-linking, the acrylic rubber composition of the present invention is heated. The heating temperature is preferably from 130 to 220° C., more preferably from 140 to 200° C., and further preferably from 150 to 200° C., and the cross-linking time is preferably from 30 seconds to 5 hours, and more preferably from 3 to 60 minutes, for heating.

The heating method may be appropriately selected from among methods to be used for cross-linking of rubber, such as press heating, steam heating, oven heating, hot-air heating, and the like.

After the primary cross-linking, secondary cross-linking may be conducted to assuredly cross-link the cross-linked product deeply into its interior. Although depending on the heating method, cross-linking temperature, shape, and the like, the secondary cross-linking is conducted at a heating temperature, which is preferably from 150 to 250° C., and over a heating time, which is preferably from 0.5 to 24 hours. The oven heating or the like may be appropriately selected as the heating method.

The molding method for the rubber composition of the present invention is not particularly limited. It is possible to use any method, such as compression molding, injection molding, transfer molding, extrusion molding, or the like.

In the present invention, it is possible to adopt: a method configured to simultaneously conduct molding and cross-linking, by adopting an injection molding machine, compression molding machine, vulcanizing (crosslinking) press, or the like; or another method configured to conduct cross-linking after molding.

In the present invention, the acrylic rubber composition is to be preferably molded and used for a sealing part selected from a group consisting of an O-ring, gasket, and packing.

EXAMPLES

The effects of the present invention will be exemplified by Examples, hereinafter.

Example 1

| | |
|---|---|
| AR14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Flake graphite ("C-1" produced by Nichiden Carbon Co., Ltd.; average particle diameter of 11 μm): | 10 parts by weight |
| Liquid paraffin ("70-S" produced by Sanko Chemical Co., Ltd.; viscosity of 12.7 CSt (40° C.)): | 1.0 part by weight |
| Crosslinking agent: N,N'-dicinnamylidene-1,6-hexanediamine ("Diak No. 3" produced by DuPont Dow Elastomers): | 1.0 part by weight |

These blended components were kneaded in a kneader and an open roll mill. The resultant rubber composition was subjected to molding by primary vulcanization (crosslink) at 170° C. for 20 minutes by a vulcanizing (crosslinking) press, and secondary vulcanization (crosslink) at 150° C. for 24 hours by a heating oven, thereby obtaining a vulcanized (crosslinked) sheet of 150 mm×150 mm×2 mm, and an O-ring of G25 size (inside diameter of 24.4 mm, and cross-sectional diameter of 3.1 mm).

The obtained vulcanized (crosslinked) sheet was subjected to measurement of normal physical properties, and to conduction of compression set test.

In turn, the composition had been evaluated for a roll tackiness and a dough-like-material tackiness.

<Evaluation Method>

(Normal Physical Property)

1. Rubber hardness Hs: this was measured by a Type A durometer, according to JIS K6253.

2. Tensile strength TB (MPa): this was measured according to JIS K-6251.

3. Ultimate elongation EB (%): this was measured according to JIS K6251.

(Compression Set CS)

The O-ring of the G25 size (inside diameter of 24.4 mm, and cross-sectional diameter of 3.1 mm) was evaluated for its compression set (%) after heat-resistant ageing of 150° C.×70 hours according to JIS K 6262. The evaluation result is shown in Table 1.

(Roll Tackiness)

Roll tackiness was evaluated according to the following criterion, when the dough-like material discharged from the kneader was wound around rolls of a 10-inch open roll mill while setting a roll spacing at 5 mm, and the vulcanizing agent (crosslinking agent) and the vulcanization accelerator (crosslink accelerator) were additionally charged into the open roll mill to conduct kneading. The result is shown in Table 1.

◎: condition where the composition was allowed to be extremely readily kneaded by a known method; superb.

○: condition where the composition was allowed to be kneaded by a known method.

x: bad (unable to be kneaded): condition where the dough-like material was not separable from a roll surface, or where the dough-like material was strongly tacked onto a roll surface to cause considerable hazardousness in operation.

(Dough-Like-Material Tackiness)

The dough-like material was discharged from the 10-inch open roll mill into a sheet shape having a dough-like material thickness of 5 to 8 mm; the dough-like material sheet was cut into strips of 2 cm width; then two sheets of dough-like material were overlapped with each other in an area of 2 cm×2 cm, followed by application of a load of 200 g thereto, and thereafter left to stand still for 12 hours; and a peeling test was then conducted for evaluation according to the following criterion. The result is shown in Table 1.

◎: Dough-like material sheets were readily peelable from each other.

○: Dough-like material sheets were peelable from each other at an interface therebetween, with a relatively small force.

x: Tacking was considerably strong, so that dough-like material sheets were not peelable from each other at an interface therebetween.

Example 2

The blending formulation in Example 1 was changed in the following manner, and evaluation was conducted in the same manner. The result is shown in Table 1.

| | |
|---|---|
| AR14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Flake graphite ("C-1" produced by Nichiden Carbon Co., Ltd.; average particle diameter of 11 μm): | 20 parts by weight |
| Crosslinking agent: N,N'-dicinnamylidene-1,6-hexanediamine ("Diak No. 3" produced by DuPont Dow Elastomers): | 1.0 part by weight |

Example 3

The polymer in Example 1 was changed to AR12 (ACM polymer produced by JSR corporation), and evaluation was conducted in the same manner. The result is shown in Table 1.

Comparative Example 1

The blending formulation in Example 1 was changed in the following manner, and evaluation was conducted in the same manner. The result is shown in Table 1.

| | |
|---|---|
| AR14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Crosslinking agent: N,N'-dicinnamylidene-1,6-hexanediamine ("Diak No. 3" produced by DuPont Dow Elastomers): | 1.0 part by weight |

Comparative Example 2

The blending formulation in Example 1 was changed in the following manner, and evaluation was conducted in the same manner. The result is shown in Table 1.

| | |
|---|---|
| AR14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Flake graphite ("C-1" produced by Nichiden Carbon Co., Ltd.; average particle diameter of 11 μm): | 40 parts by weight |
| Liquid paraffin ("70-S" produced by Sanko Chemical Co., Ltd.; viscosity of 12.7 CSt (40° C.)): | 1.0 part by weight |
| Crosslinking agent: N,N'-dicinnamylidene-1,6-hexanediamine ("Diak No. 3" produced by DuPont Dow Elastomers): | 1.0 part by weight. |

Comparative Example 3

The blending formulation in Example 1 was changed in the following manner, and evaluation was conducted in the same manner. The result is shown in Table 1.

| | |
|---|---|
| AR14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |

-continued

| | |
|---|---|
| Amorphous graphite ("A-0" produced by Nichiden Carbon Co., Ltd.; average particle diameter of 13 μm): | 10 parts by weight |
| Liquid paraffin ("70-S" produced by Sanko Chemical Co., Ltd.; viscosity of 12.7 CSt (40° C.)): | 1.0 part by weight |
| Crosslinking agent: N,N'-dicinnamylidene-1,6-hexanediamine ("Diak No. 3" produced by DuPont Dow Elastomers): | 1.0 part by weight |

Comparative Example 4

The blending formulation in Example 1 was changed in the following manner, and evaluation was conducted in the same manner. The result is shown in Table 1.

| | |
|---|---|
| R14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Artificial graphite ("G-6S" produced by Chuetsu Graphite Works Co., Ltd.; | 10 parts by weight |

| | |
|---|---|
| AR14 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Liquid paraffin ("70-S" produced by Sanko Chemical Co., Ltd.; viscosity of 12.7 CSt (40° C.)): | 2.0 parts by weight |
| Crosslinking agent: N,N'-dicinnamylidene-1,6-hexanediamine ("Diak No. 3" produced by DuPont Dow Elastomers): | 1.0 part by weight |

Comparative Example 6

The blending formulation in Example 1 was changed in the following manner, and evaluation was conducted in the same manner. The result is shown in Table 1.

| | |
|---|---|
| AR12 (ACM polymer produced by JSR corporation): | 100 parts by weight |
| FEF carbon ("SEAST G-SO" produced by Tokai Carbon Co., Ltd.; primary particle diameter: 40-48 nm): | 50 parts by weight |
| Crosslinking agent: N,N'-dicinnamylidene-1,6-hexanediamine ("Diak No. 3" produced by DuPont Dow Elastomers): | 1.0 part by weight |

TABLE 1

| | Example 1 | Example 2 | Example 3 | Comp. Example 1 | Comp. Example 2 | Comp. Example 3 | Comp. Example 4 | Comp. Example 5 | Comp. Example 6 |
|---|---|---|---|---|---|---|---|---|---|
| AR14 (ACM polymer produced by JSR) | 100 | 100 | | 100 | 100 | 100 | 100 | 100 | |
| AR12 (ACM polymer produced by JSR) | | | 100 | | | | | | 100 |
| FEF Carbon | 50 | 50 | 50 | 50 | 50 | 50 | 50 | 50 | 50 |
| Flake graphite (C-1 produced by Nichiden Carbon) | 10 | 20 | 10 | | 40 | | | | |
| Amorphous graphite (A-0 produced by Nichiden Carbon) | | | | | | 10 | | | |
| Artificial graphite (G-6S produced by Chuetsu Graphite Works Co., Ltd.) | | | | | | | 10 | | |
| Liquid paraffin (70-S produced by Sanko Chemical) | 1.0 | | 1.0 | | 1.0 | 1.0 | 1.0 | 2.0 | |
| Diak No. 3 | 1.0 | 1.0 | 1.0 | 1.0 | 1.0 | 1.0 | 1.0 | 1.0 | 1.0 |
| *Normal physical property* | | | | | | | | | |
| Rubber hardness Hs (Duro A) | 70 | 72 | 71 | 71 | 75 | 71 | 71 | 69 | 72 |
| Tensile strength TB (MPa) | 10.2 | 9.7 | 11.5 | 11.8 | 6.2 | 11.8 | 11.2 | 11.0 | 12.1 |
| Ultimate elongation EB (%) | 130 | 120 | 140 | 140 | 80 | 140 | 140 | 140 | 140 |
| Compression set CS (%) (150° C.-70 Hr) | 15 | 14 | 13 | 14 | 14 | 14 | 15 | 17 | 14 |
| Roll tackiness | ◉ | ◉ | ◉ | X | ◉ | X | ◉ | ○ | X |
| Dough-like material tackiness | ○ | ○ | ◉ | X | ○ | ○ | X | ○ | X |

(parts by weight)

-continued

| | |
|---|---|
| average particle diameter of 8 μm): | |
| Liquid paraffin ("70-S" produced by Sanko Chemical Co., Ltd.; viscosity of 12.7 CSt (40° C.)): | 1.0 part by weight |
| Crosslinking agent: N,N'-dicinnamylidene-1,6-hexanediamine ("Diak No. 3" produced by DuPont Dow Elastomers): | 1.0 part by weight |

Comparative Example 5

The blending formulation in Example 1 was changed in the following manner, and evaluation was conducted in the same manner. The result is shown in Table 1.

The invention claimed is:

1. A method for producing a cross-linked acrylic rubber product, comprising:
   a kneading step for kneading, by a roll, an acrylic rubber composition comprising: 100 parts by weight of an ACM polymer, which contains monomers each having a carboxyl group(s) as crosslinking-site monomers, respectively; and 10 to 20 parts by weight of natural flake graphite;
   a molding step for molding the unvulcanized, dough-like material obtained by the kneading in the kneading step, into a sealing part selected from the group consisting of an O-ring, gasket, and packing; and
   a cross-linking step for cross-linking the sealing part after the molding, to produce a cross-linked product of the sealing part.

2. A method for producing a cross-linked acrylic rubber product, comprising:

a kneading step for kneading, by a roll, an acrylic rubber composition comprising: 100 parts by weight of an ACM polymer, which contains monomers each having a carboxyl group(s) as crosslinking-site monomers, respectively; 10 to 20 parts by weight of natural flake graphite; and 0.5 to 1.5 parts by weight of a liquid paraffin;

a molding step for molding the unvulcanized, dough-like material obtained by the kneading in the kneading step, into a sealing part selected from the group consisting of an O-ring, gasket, and packing; and a cross-linking step for cross-linking the sealing part after the molding, to produce a cross-linked product of the sealing part.

* * * * *